United States Patent [19]

Ichikawa

[11] Patent Number: 5,917,957
[45] Date of Patent: Jun. 29, 1999

[54] METHOD OF AND APPARATUS FOR PROCESSING AN IMAGE

[75] Inventor: Masayoshi Ichikawa, Tokyo, Japan

[73] Assignee: Advantest Corporation, Tokyo, Japan

[21] Appl. No.: 08/797,125

[22] Filed: Feb. 10, 1997

[30] Foreign Application Priority Data

Apr. 8, 1996 [JP] Japan ................................. 8-085432
Oct. 17, 1996 [JP] Japan ................................. 8-274590

[51] Int. Cl.$^6$ ................................................. G06K 9/48
[52] U.S. Cl. .......................................... 382/274; 382/275
[58] Field of Search ........................... 382/132, 199–200, 382/270–274, 275, 278; 358/463; 364/724.03

[56] References Cited

U.S. PATENT DOCUMENTS

| | | |
|---|---|---|
| 4,601,057 | 7/1986 | Tsuji et al. ............................. 382/51 |
| 5,047,851 | 9/1991 | Sauerwein et al. ..................... 358/101 |
| 5,081,689 | 1/1992 | Meyer et al. ............................ 382/22 |
| 5,506,913 | 4/1996 | Ibison et al. ........................... 382/132 |
| 5,651,042 | 7/1997 | Dewaele .................................. 378/62 |

*Primary Examiner*—Thomas D. Lee
*Assistant Examiner*—Stephen Brinich
*Attorney, Agent, or Firm*—Oblon, Spivak, McClelland, Maier & Neustadt, P.C.

[57] ABSTRACT

Original image data which are inputted are processed to selectively detect only a color stain among luminance irregularities which are caused by abnormalities of color filters of a color LCD panel. Black defects darker than a surrounding area which contain white defects brighter than a surrounding area are extracted, or white detects which contain black defects are extracted, by processing the original image data.

6 Claims, 3 Drawing Sheets

+ CENTER OF WHITE DEFECT OR BLACK DEFECT

□ CIRCUMSCRIBING RECTANGLE OF WHITE DEFECT OR BLACK DEFECT

METHOD OF AND APPARATUS FOR PROCESSING AN IMAGE

BACKGROUND OF THE INVENTION

1. Field of the Invention

The present invention relates to a method of and an apparatus for processing an image, and more particularly to a method of and an apparatus for processing an image while accurately detecting luminance irregularities developed by deficiencies of color filters of a color liquid-crystal display panel.

2. Description of the Related Art

Liquid-crystal display (LCD) panels manufactured according to the semiconductor fabrication technology, particularly the integrated-circuit fabrication technology, suffer a variety of defects. One of such defects is known as a luminance irregularity or an area defect that occurs in a uniform white image which is displayed on an LCD panel.

Luminance irregularities include a luminance irregularity which is brighter than the surrounding image and a luminance irregularity which is darker than the surrounding image. The former luminance irregularity is called a white defect, and the latter luminance irregularity is called a black defect.

Color LCD panels employ color filters of three primaries R (red), G (green), B (blue). Such color LCD panels tend to be defective if color filter materials are not uniformly fixed to the color LCD panel due to a lack of planarity thereof. When an image of a uniform color of R, G, or B is displayed on a color LCD panel using color filters that suffer such a defect, the displayed image is subjected to luminance irregularities. FIG. 1(a) of the accompanying drawings shows luminance irregularities that occur in an image displayed on a color LCD panel. FIG. 1(b) of the accompanying drawings illustrates a change in the luminance along line A–B in the displayed image shown in FIG. 1(a), and FIG. 1(c) of the accompanying drawings illustrates a change in the luminance along line C–D in the displayed image shown in FIG. 1(a).

According to one defect of color filters, a color filter material for a pixel is not fixed in the position of the pixel, but dispersed radially outwardly onto surrounding pixels around the pixel. When an image which is uniform in its entirety and has the same color as the dispersed color filter material is displayed using the defective color filters, backlight passes through the pixel where the color filter material is not fixed, producing an intensively bright white defect, and does not pass through the surrounding pixels because of an increased thickness of the color filter material dispersed over the surrounding pixels, producing a doughnut-shaped or annular black defect, as shown in FIG. 1(b).

According to another defect of color filters, a color filter material for plural pixels is concentrated on a certain pixel, but is not dispersed radially outwardly onto surrounding pixels around the pixel. When an image which is uniform in its entirety and has the same color as the concentrated color filter material is displayed using the defective color filters, backlight does not pass through the pixel where the color filter material is concentrated and has an increased thickness, producing a dark black defect, and passes through the surrounding pixels because the color filter material is not fixed to the surrounding pixels, producing an intensively bright doughnut-shaped or annular white defect, as shown in FIG. 1(c).

The doughnut-shaped black and white defects, whose radius is as large as four or five pixels, produced by a color filter defect corresponding to one pixel are often called a "color stain" because they look like a local "stain" on the color LCD panel.

When a color LCD panel is fabricated, therefore, it is necessary to carry out an image quality inspection process for evaluating the fabricated color LCD panel for any luminance irregularities caused by color filter defects. According to one conventional image quality inspection process, a test image is displayed on the fabricated color LCD panel and visually observed by the inspector, who decides whether the color LCD panel contains a defect or not based on the quality of the observed test image. However, the visual inspection is problematic in that subjective standards for judging test image quality are indefinite, and the resulting judgment tends to vary from inspector to inspector and be affected by fatigue.

In view of the drawbacks of the manual subjective inspection process, there has been developed an automatic image quality inspecting device for inspecting the quality of a test image displayed on a color LCD panel by processing a digital image which is produced by imaging the displayed test image with a high-resolution CCD image sensor. The automatic image quality inspecting device has been made possible by recent image processing technology achievements that permit luminance variations of low contrast to be detected accurately.

The image processing process which is carried out by the automatic image quality inspecting device will be described below. A test image displayed on a color LCD panel which is being inspected is imaged by a high-resolution CCD image sensor, and the data of a digital image (referred to as original image data) produced by the high-resolution CCD image sensor are processed in various fashions to detect a luminance irregularity. The image processing process makes it possible to detect a luminance irregularity which has a contrast level ranging from about 3 to 7% by using filters for noise removal and contrast enhancement and threshold processing. The image processing process will be described in greater detail below.

The original image data contain shading in luminance due to the angle of field of the liquid crystal. Since a change in luminance due to shading is greater than the contrast of luminance irregularities, the image processing process first removes shading in luminance. For the removal of shading, the original image data are processed into smoothed image data by an average filter or a median filter, and the smoothed image data are subtracted from the original image data, thus removing shading. The smoothed image data are referred to as shading image data, and the image data from which shading has been removed are referred to as differential image data.

The differential image data contain luminance irregularities, spike noise introduced when the displayed test image is imaged, and noise comprising shading components which have remain unremoved. These noises are removed by filtering the differential image data. Thereafter, the luminance irregularities contained in the differential image data are detected.

Color stains, however, cannot easily be detected as they are luminance irregularities of a very low contrast level, which experimentally turned out to range from 2 to 3%, caused by a slight difference between color filter thicknesses. Inasmuch as the contrast of color stains is similar to that of noises, if color stains were to be detected with a lowered threshold, then noises would also be detected. Therefore, it is not possible to selectively detect color stains with simple threshold processing.

SUMMARY OF THE INVENTION

It is therefore an object of the present invention to provide a method of and an apparatus for processing an image to selectively detect only color stains contained in the image.

According to the present invention, there is provided a method of processing inputted original image data, comprising the steps of:

(a) filtering the original image data to produce shading image data and determining differential image data from the original image data and the shading image data;

(b) effecting first threshold processing on the differential image data to extract therefrom white defects which are represented by luminance irregularities brighter than a surrounding area, thereby to produce first binary image data indicative of the positions of the white defects;

(c) effecting second threshold processing on the differential image data to extract therefrom black defects which are represented by luminance irregularities darker than a surrounding area, thereby to produce second binary image data indicative of positions of the black defects; and (d) extracting only a black defect in which one of the white defects determined by the step (b) is present, from the black defects determined by the step (c).

According to the present invention, there is also provided a method of processing inputted original image data, comprising the steps of:

(a) filtering the original image data to produce shading image data and determining differential image data from the original image data and the shading image data;

(b) multiplying the shading image data by a first constant and then by a second constant thereby to determine the rate of a reduction of visual sensitivity to luminance;

(c) multiplying the differential image data by the rate of the reduction of visual sensitivity per pixel;

(d) effecting first threshold processing on the differential image data to extract therefrom white defects which are represented by luminance irregularities brighter than a surrounding area, thereby to produce first binary image data indicative of the positions of the white defects;

(e) effecting second threshold processing on the differential image data to extract therefrom black defects which are represented by luminance irregularities darker than a surrounding area, thereby to produce second binary image data indicative of positions of the black defects; and (f) extracting only a black defect in which one of the white defects determined by the step (d) is present, from the black defects determined by the step (e);

wherein the first constant comprises a negative number, and the differential image data at positions corresponding to an area of the original image data where the luminance is high are suppressed.

According to the present invention, there is further provided an apparatus for processing inputted original image data, comprising:

an original image memory for storing the original image data;

a filter for filtering the original image data to generate shading image data;

a subtractor for generating differential image data between the original image data and the shading image data;

first threshold processing means for effecting first threshold processing on the differential image data to extract therefrom white defects which are represented by luminance irregularities brighter than a surrounding area, thereby to produce first binary image data;

first region dividing means for determining first region image data representative of regions of the respective white defects with respect to the first binary image data;

central address calculating means for determining addresses of centers of the regions of the respective white defects from the first binary image data;

second threshold processing means for effecting second threshold processing on the differential image data to extract therefrom black defects which are represented by luminance irregularities darker than a surrounding area, thereby to produce second binary image data;

second region dividing means for determining second region image data representative of regions of the respective black defects with respect to the second binary image data;

vertex address calculating means for determining addresses of vertexes of circumscribing or inscribing rectangles of the regions of the respective black defects from the second binary image data; and noise region removing means for comparing the addresses of centers of the regions of the respective white defects, determined by the central address calculating means, with the addresses of vertexes of circumscribing or inscribing rectangles of the regions of the respective black defects, determined by the vertex address calculating means, and removing other regions of black defects from the second region image data than those regions of black defects in which the centers of the regions of white defects overlap the circumscribing rectangles.

The methods and the apparatus referred to above serve to detect a doughnut-shaped black defect. However, the present invention is also effective to detect a doughnut-shaped white defect by detecting white defects instead of black defects and black defects instead of white defects in appropriate steps or means.

A color stain to be selectively detected according to the present invention may be a combination of a doughnut-shaped black defect of low contrast whose radius is as large as four or five pixels and a doughnut-shaped white defect of high contrast whose radius is as large as one or two pixels and which is positioned at the center of the black defect, or a combination of a doughnut-shaped white defect of high contrast whose radius is as large as four or five pixels and a doughnut-shaped black defect of low contrast whose radius is as large as one or two pixels and which is positioned at the center of the white defect.

Specifically, when a white defect and a black defect of a color stain are determined, the address of the center of the white defect and the address of the center of the black defect agree with each other. If the color stain looks like a doughnut-shaped black defect, then the address of the center of the white defect is positioned within the black defect, and if the color stain looks like a doughnut-shaped white defect, then the address of the center of the black defect is positioned within the white defect.

According to the principles of the present invention, a color stain is selectively detected among luminance irregularities based on the above features of the configuration of the color stain.

In the above methods according to the present invention, differential image data from which shading is removed are generated from original image data. Then, plural white and black defects are determined from the differential image data by threshold processing, and the addresses of centers of the white defects (or black defects) and the addresses of vertexes of circumscribing rectangles of the black defects (or white defects) are determined.

For combinations of all the white and black defects thus determined, the addresses of centers of the white defects (or black defects) and the addresses of vertexes of circumscribing rectangles of the black defects (or white defects) are compared with each other. Other black defects (or white defects) than those black defects (or white defects) in which the centers of white defects (or black defects) are positioned within their circumscribing rectangles are removed, for thereby selectively detecting a color stain.

The above and other objects, features, and advantages of the present invention will become apparent from the following description with references to the accompanying drawings which illustrate an example of the present invention.

DETAILED DESCRIPTION OF THE PREFERRED EMBODIMENT

Figure 1A:
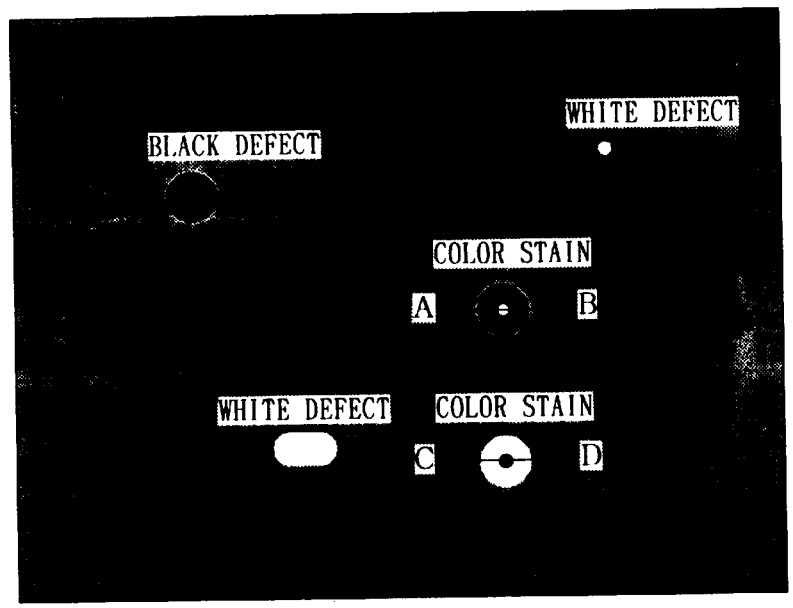
FIG. 1(a) is a view showing luminance irregularities that occur in an image displayed on a color LCD panel.
Figure 1B:
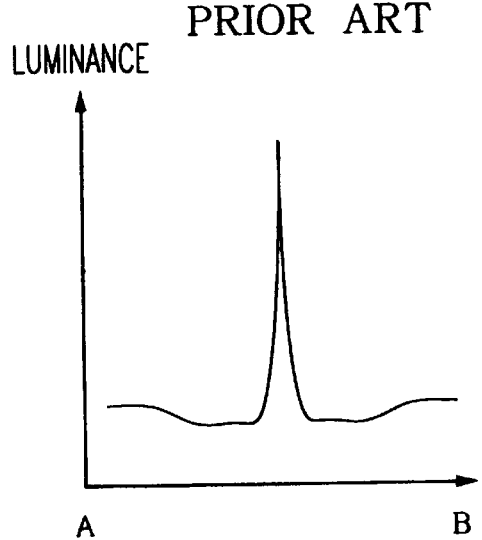
FIG. 1(b) is a diagram showing a change in luminance along line A–B on the image shown in FIG. 1(a)
Figure 1C:
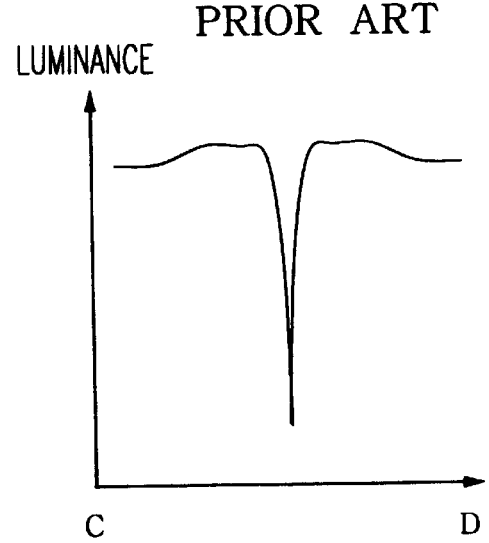
FIG. 1(c) is a diagram showing a change in luminance along line C–D on the image shown in FIG. 1(a)
Figure 2:
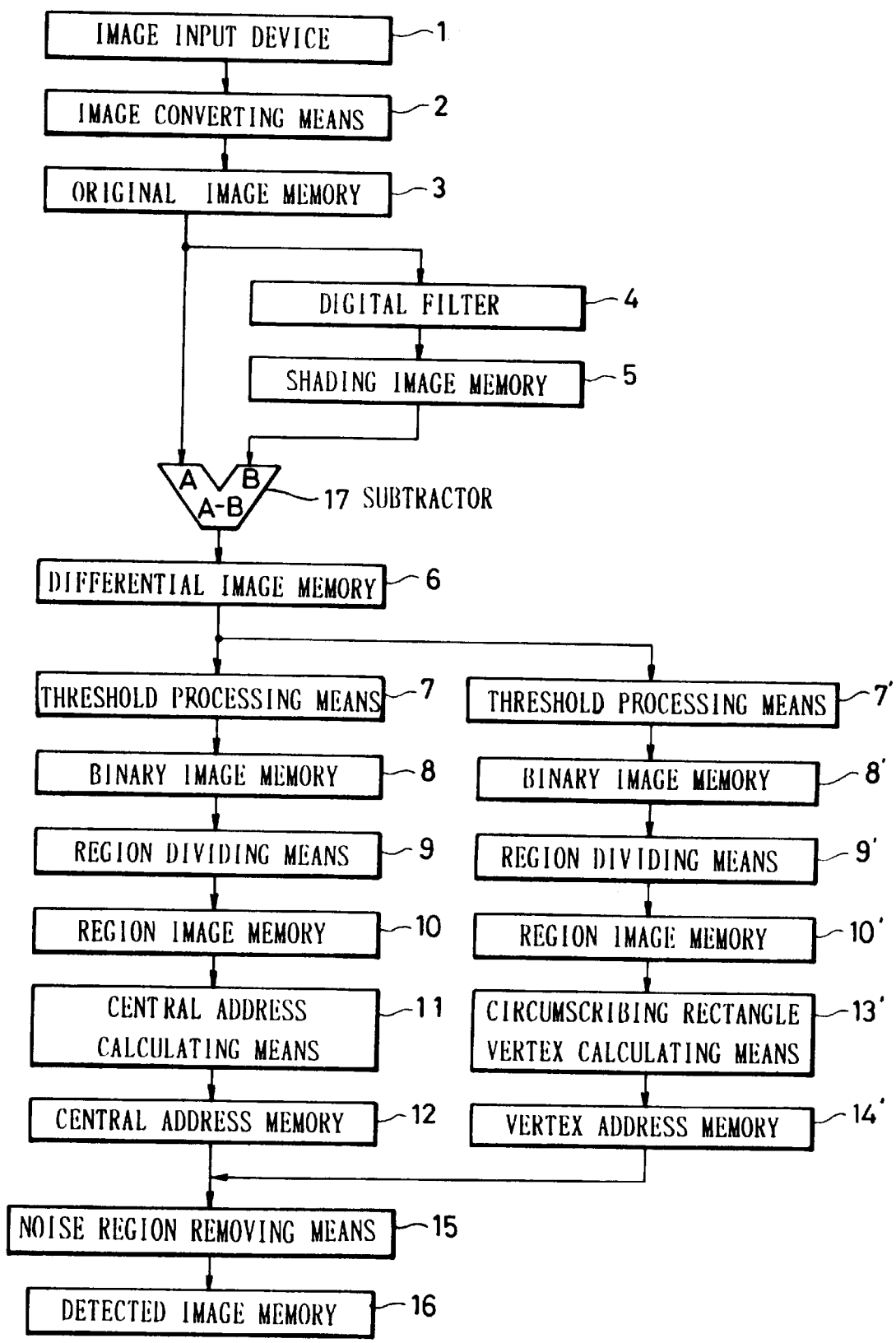
FIG. 2 is a block diagram of an image processing apparatus according to the present invention.

FIG. 2 shows in block form an image processing apparatus according to the present invention.

As shown in FIG. 2, the image processing apparatus comprises an image input device 1 such as a high-resolution CCD image sensor, an image converting means 2, an original image memory 3, a digital filter 4, a shading image memory 5, a differential image memory 6, threshold processing means 7, 7', binary image memories 8, 8', region dividing means 9, 9', region image memories 10, 10', a central address calculating means 11, a central address memory 12, a circumscribing rectangle vertex address calculating means 13, a vertex address memory 14, a noise region removing means 15, and a detected image memory 16. The above image memories serve to store image data. The image data stored in the image memories are read as required from those image memories. The binary image memories 8, 8' and the region image memories 10, 10' may share respective common memories.

Each of the above components of the image processing apparatus will be described below with respect to a process of detecting a color stain. A color stain to be detected as described below is a black doughnut-shaped color stain comprising a white defect which is present in a black defect.

The image input device 1 images a color LCD panel on which an image of the color R, G, or B that is uniform in its entirety is displayed. An imaging signal which is outputted from the image input device 1 is converted by the image converting means 2 into original image data which are stored in the original image memory 3.

The original image data which are read from the original image memory 3 are subjected to smoothing filtering by an average filter or a median filter that is implemented by the digital filter 4, thus producing shading image data that are stored in the shading image memory 5.

The original image data which are read from the original image memory 3 and the shading image data which are read from the shading image memory 5 are supplied to a subtractor 17 which generates differential image data, which are representative of the difference between the original image data and the shading image data. The differential image data are stored in the differential image memory 6. In the differential image data, the data of a region such as a white defect whose luminance is higher than shading are of a positive value, and the data of a region such as a black defect whose luminance is lower than shading are of a negative value.

First, a white defect is detected from the differential image data as follows:

The differential image data which are read from the differential image memory 6 are subjected to threshold processing by the threshold processing means 7. Specifically, a pixel value of the differential image data of each pixel are compared with a threshold Tb (>0), which has been empirically determined to separate white defects from noise. If a pixel value of the differential image data is equal to or greater than Tb, then the value of a corresponding pixel of binary image data is set to "1". If a pixel value of the differential image data is smaller than Tb, then the value of a corresponding pixel of binary image data is set to "0". In this manner, binary image data are generated and stored in the binary image memory 8. The binary image data which are read from the binary image memory 8 are subjected to region dividing processing by the region dividing means 9, thereby producing region image data. The region dividing processing may be carried out according to a labeling process, for example. In the labeling process, the binary image data are scanned, and if pixels having a value "1" are present in the vicinity of a pixel having a value "1", then those pixels are assigned the same label (number), and if pixels having a value "1" are present in different positions, then those pixels are assigned different labels. In this fashion, a plurality of regions can be divided in the binary image data, and can sequentially be processed. By counting pixels to which the same label is assigned, it is possible to determine the area of the region of that label. The region image data generated by the labeling process are stored in the region image memory 10. The central address calculating means 11 reads the region image data from the region image memory 10 and sequentially processing M regions in the region image data to calculate the addresses of central positions of the respective regions. Specifically, if the addresses of I pixels which make up the region of a label "m" are expressed by:

$$(x_i^m, y_i^m)(i=1, 2, \ldots, I)$$

then the address of the central position of the region of the label "m" is represented as follows:

$$\left( \frac{\sum_{i=1}^{I} x_i^m}{I}, \frac{\sum_{i=1}^{I} y_i^m}{I} \right)$$

The calculated address of the central position of each of the regions is then stored in the central address memory 12.

Then, a black defect is detected from the differential image data as follows:

The differential image data which are read from the differential image memory 6 are subjected to threshold processing by the threshold processing means 7'. Specifically, a pixel value of the differential image data of each pixel are compared with a threshold Td (<0), which has been empirically determined to separate black defects from noise. If a pixel value of the differential image data is equal to or smaller than Td, then the value of a corresponding pixel of binary image data is set to "1". If a pixel value of the differential image data is greater than Td, then the value of a corresponding pixel of binary image data is set to "0". In this manner, binary image data are generated and stored in the binary image memory 8'.

The binary image data which are read from the binary image memory 8' are subjected to region dividing processing by the region dividing means 9', thereby producing region image data. The region dividing processing may be carried out according to a labeling process, for example, in the same manner as for the detection of a white defect. The region image data generated by the labeling process are stored in the region image memory 10'.

Figure 3:
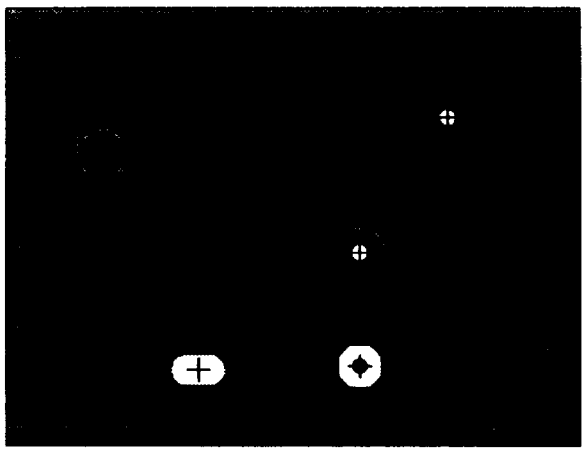
FIG. 3 is a view showing for comparison the positions of regions of white and black defects.

The circumscribing rectangle vertex address calculating means 13 reads the region image data from the region image memory 10' and sequentially processes N regions in the region image data to calculate the addresses of two diagonal vertexes of a circumscribing rectangle of each of the regions. These addresses of the vertexes are used to compare their positions with the centers of the regions of white addresses which have been calculated as described above. As shown in FIG. 3, the addresses of the vertexes may be the addresses of upper left and lower right vertexes of the circumscribing rectangle.

If the addresses of I pixels which make up the region of a label "n" are expressed by $(x_i^n, y_i^n)$ (i=1, 2, ..., I), then the address of the upper left vertex of the circumscribing rectangle of the region is represented by (Min $(x_i^n)$, Min $(y_i^n)$), and the address of the lower right vertex of the circumscribing rectangle of the region is represented by (Max $(x_i^n)$, Max $(y_i^n)$), where Min () indicates a process to determine a minimum value and Max () indicates a process to determine a maximum value. The addresses of vertexes of a circumscribing rectangle of each of the regions are stored in the vertex address memory 14.

The noise region removing means 15 reads the central address data of the regions of white defects from the central address memory 12, reads the vertex address data of the regions of black defects from the vertex address memory 14, and reads the region image data of black defects from the region image memory 10'. The noise region removing means 15 then compares the central address data, expressed by $(x_c^m, y_c^m)$ (m=1, 2, ..., M), of the regions of white defects, the upper left vertex address data, expressed by $(x_s^n, y_s^n)$ (n=1, 2, ..., N), of the regions of black defects, and the lower right vertex address data, expressed by $(x_e^n, y_e^n)$ (n=1, 2, ..., N), of the regions of black defects, thereby to search for a black defect "n" which satisfies the conditions:

$$x_s^n < x_c^m < x_e^n, \ y_s^n < y_c^m < y_e^n$$

with respect to an arbitrary white defect "m".

If the black defect "n" satisfies the above conditions, then it is judged as a doughnut-shaped black defect comprising a white defect present in a black defect, constituting an actual color stain. If the black defect "n" does not satisfy the above conditions, then it is regarded as noise.

If a given black defect "n1" does not satisfy the above conditions, then it is removed from the region image data by setting the value of a pixel of the region image data, to which a label "n1" is assigned, to "0". The regions of black defects which satisfy the above conditions are judged to remain as they are. The address data of the regions of all black defects and the address data of the regions of all white defects are compared with each other. After regions, regarded as noise, which do not satisfy the above conditions have been removed, the addresses of the regions of black defects remaining in the region image data are checked, generating detected image data in which the values of corresponding addresses are set to "1". The generated detected image data are stored in the detected image memory 16. The process of detecting a color stain is now finished.

The above process is carried out three times by changing the color displayed by the color LCD panel to R, G, B.

In the above embodiment, a black defect is expressed using a circumscribing rectangle of the region of that black defect, and its position is compared with the region of a white defect to determine whether the white defect is positioned in the black defect or not. This is to take into account the fact that the region of a black defect may be deformed out of a doughnut shape upon threshold processing or region dividing processing. If the S/N ratio of inputted original image data is good enough to ignore any deformation of the regions of black defects, then the interior of a black defect may be expressed by an inscribing rectangle rather than a circumscribing rectangle.

The regions of white and black defects are represented by the addresses of their centers and the addresses of vertexes of their circumscribing rectangles for simplifying the comparison process. Rather than using those parameters, image data of the region of a white defect and image data of the region of a black defect may be generated to directly compare the values of pixels of corresponding addresses.

While processing details that are indispensable for the present invention have been described above, the differential image data may be subjected to noise removal processing and contrast enhancing processing, described below, and may subsequently be processed by the process described above.

The noise removal processing serves to remove spike noise introduced when the displayed test image is imaged, and noise comprising shading components which have remain unremoved by differential data processing, from the differential image data by passing the differential image data through a filter.

The contrast enhancing processing is effective not to detect luminance irregularities that are allowable for visual observation, and is carried out in order to equalize the detection of luminance irregularities as much as possible to the detection thereof by a visual inspection process. According to the contrast enhancing processing, it is interpreted that a visual inspection process is based on the intensity of contrast depending not on the difference of a change, but on the rate of a change, from around a local region, and shading image data per pixel of the differential image data are multiplied by a first constant and then by a second constant to determine the rate of a reduction in the visual sensitivity to luminance, and then the differential image data are multiplied by the rate of the reduction in the visual sensitivity per pixel. The first constant is represented by a negative number, and the differential image data at positions corresponding to an area of the original image data where the luminance is high are suppressed. In this manner, luminance irregularities that are allowable for visual observation are not detected, and the detection of luminance irregularities are equalized as much as possible to the detection thereof by the visual inspection process.

In the illustrated embodiment, a doughnut-shaped black defect is detected. However, it is possible to detect a doughnut-shaped white defect by detecting a white defect instead of a black defect and a black defect instead of a white defect in appropriate steps of the above process. The process for detecting a doughnut-shaped black defect is similar to the illustrated process except that defects to be detected are switched around and data stored in the region image memories 10, 10' are also switched around, and will not be described in detail below.

According to the present invention, as described above, it is possible to selectively detect only a color stain, which has conventionally been difficult to detect, by extracting a black defect with a white defect being present centrally therein or a white defect with a black defect being present centrally therein.

Furthermore, if differential image data are to be adjusted using the rate of a reduction in the visual sensitivity determined from the shading image data, then the detection of luminance irregularities may be equalized as much as possible to the detection thereof by a visual inspection process.

Although a preferred embodiment of the present invention has been described using specific terms, such description is for illustrative purposes only, and it is to be understood that changes and variations may be made therein without departing from the spirit or scope of the following claims.

What is claimed is:

1. A method of processing inputted original image data, comprising the steps of:
   (a) filtering the original image data to produce shading image data and determining differential image data from the original image data and the shading image data;
   (b) effecting first threshold processing on said differential image data to extract therefrom white defects which are represented by luminance irregularities brighter than a surrounding area, thereby to produce first binary image data indicative of the positions of the white defects;
   (c) effecting second threshold processing on the differential image data to extract therefrom black defects which are represented by luminance irregularities darker than a surrounding area, thereby to produce second binary image data indicative of positions of the black defects; and
   (d) comparing positions of said white and black defects using said first binary image data and said second binary image data to extract only those of said black defects in which one of said white defects has a similar position.

2. A method of processing inputted original image data, comprising the steps of:
   (a) filtering the original image data to produce shading image data and determining differential image data from the original image data and the shading image data;
   (b) multiplying said shading image data by a first constant and then by a second constant thereby to determine the rate of a reduction of visual sensitivity to luminance;
   (c) multiplying said differential image data by the rate of reduction of visual sensitivity per pixel;
   (d) effecting first threshold processing on said differential image data to extract therefrom white defects which are represented by luminance irregularities brighter than a surrounding area, thereby to produce first binary image data indicative of the positions of the white defects;
   (e) effecting second threshold processing on the differential image data to extract therefrom black defects which are represented by luminance irregularities darker than a surrounding area, thereby to produce second binary image data indicative of positions of the black defects; and
   (f) comparing positions of said white and black defects using said first binary image data and said second binary image data to extract only those of said black defects in which one of said white defects has a similar position;
   wherein said first constant comprises a negative number, and said differential image data at positions corresponding to an area of the original image data where the luminance is high are suppressed.

3. An apparatus for processing inputted original image data, comprising:
   an original image memory for storing the original image data;
   a filter for filtering the original image data to generate shading image data;
   a subtractor for generating differential image data between said original image data and said shading image data;
   first threshold processing means for effecting first threshold processing on said differential image data to extract therefrom white defects which are represented by luminance irregularities brighter than a surrounding area, thereby to produce first binary image data;
   first region dividing means for determining first region image data representative of regions of the respective white defects with respect to said first binary image data;
   central address calculating means for determining addresses of centers of the regions of the respective white defects from said first binary image data;
   second threshold processing means for effecting second threshold processing on said differential image data to extract therefrom black defects which are represented by luminance irregularities darker than a surrounding area, thereby to produce second binary image data;
   second region dividing means for determining second region image data representative of regions of the respective black defects with respect to said second binary image data;
   vertex address calculating means for determining addresses of vertexes of circumscribing or inscribing rectangles of the regions of the respective black defects from said second binary image data; and
   noise region removing means for comparing the addresses of centers of the regions of the respective white defects, determined by said central address calculating means, with the addresses of vertexes of circumscribing or inscribing rectangles of the regions of the respective black defects, determined by said vertex address calculating means, and removing other regions of black defects from said second region image data than those regions of black defects in which the centers of the regions of white defects overlap the circumscribing rectangles.

4. A method of processing inputted original image data, comprising the steps of:
   (a) filtering the original image data to produce shading image data and determining differential image data from the original image data and the shading image data;
   (b) effecting first threshold processing on said differential image data to extract therefrom black defects which are represented by luminance irregularities darker than a surrounding area, thereby to produce first binary image data indicative of the positions of the black defects;

(c) effecting second threshold processing on the differential image data to extract therefrom white defects which are represented by luminance irregularities brighter than a surrounding area, thereby to produce second binary image data indicative of positions of the white defects; and (d) comparing positions of said black and white defects using said first binary image data and said second binary image data to extract only those of said white defects in which one of said black defects has a similar position.

5. A method of processing inputted original image data, comprising the steps of:

(a) filtering the original image data to produce shading image data and determining differential image data from the original image data and the shading image data;

(b) multiplying said shading image data by a first constant and then by a second constant thereby to determine the rate of a reduction of visual sensitivity to luminance;

(c) multiplying said differential image data by the rate of the reduction of visual sensitivity per pixel;

(d) effecting first threshold processing on said differential image data to extract therefrom black defects which are represented by luminance irregularities darker than a surrounding area, thereby to produce first binary image data indicative of the positions of the black defects;

(e) effecting second threshold processing on the differential image data to extract therefrom white defects which are represented by luminance irregularities brighter than a surrounding area, thereby to produce second binary image data indicative of positions of the white defects; and (f) comparing positions of said black and white defects using said first binary image data and said second binary image data to extract only those of said white defects in which one of said black defects has a similar position;

wherein said first constant comprises a negative number, and said differential image data at positions corresponding to an area of the original image data where the luminance is high are suppressed.

6. An apparatus for processing inputted original image data, comprising:

an original image memory for storing the original image data;

a filter for filtering the original image data to generate shading image data;

a subtractor for generating differential image data between said original image data and said shading image data;

first threshold processing means for effecting first threshold processing on said differential image data to extract therefrom black defects which are represented by luminance irregularities darker than a surrounding area, thereby to produce first binary image data;

first region dividing means for determining first region image data representative of regions of the respective black defects with respect to said first binary image data;

central address calculating means for determining addresses of centers of the regions of the respective black defects from said first binary image data;

second threshold processing means for effecting second threshold processing on said differential image data to extract therefrom white defects which are represented by luminance irregularities brighter than a surrounding area, thereby to produce second binary image data;

second region dividing means for determining second region image data representative of regions of the respective white defects with respect to said second binary image data;

vertex address calculating means for determining addresses of vertexes of circumscribing or inscribing rectangles of the regions of the respective white defects from said second binary image data; and noise region removing means for comparing the addresses of centers of the regions of the respective black defects, determined by said central address calculating means, with the addresses of vertexes of circumscribing or inscribing rectangles of the regions of the respective white defects, determined by said vertex address calculating means, and removing other regions of white defects from said second region image data than those regions of white defects in which the centers of the regions of black defects overlap the circumscribing rectangles.

\* \* \* \* \*